Patented Apr. 28, 1942

2,280,816

UNITED STATES PATENT OFFICE

2,280,816

ALKALOIDS OF SPECIES OF ERYTHRINA AND PROCESSES FOR THEIR PRODUCTION

Karl Folkers, Plainfield, and Frank Koniuszy, Rahway, N. J., assignors to Merck & Co., Inc., Rahway, N. J., a corporation of New Jersey No Drawing. Application May 12, 1939, Serial No. 273,366

13 Claims. (Cl. 260—236)

This invention relates to substances having a physiological action similar to that of the drug, curare, and to processes for their production from species of the genus Erythrina.

Plants of the species of the genus, Erythrina (fam. Leguminosae sup. fam. Papilionaceae), are distributed throughout the world, but are found in greatest profusion in the tropical and subtropical regions. It has been known that some species of Erythrina contain alkaloids, but the only alkaloid which has ever been isolated in pure form, and chemically identified, is the alkaloid "Hypaphorine." However, this alkaloid is relatively inactive physiologically, a property common to several alkaloid betaines. Other than this, it has only been known that alkaloids were present in a few Erythrina species, and this was known generally because of the toxic effect exhibited by the species. Nothing has been known regarding the nature of the alkaloids.

There is a definite need in medicine for drugs which may be used for certain-neuro-muscular diseases. The drug "curare," the arrow poison, is a crude, complex mixture obtained from many plants (species of Strychnos, Menispermaceous plants, etc.). Curare is difficult to obtain, is expensive, and its action, potency and toxicity, vary according to the plants used as a source, their geographical origin, processes and care used in their preparation, etc. For these reasons, it is not well suited for use in medicine.

In co-pending applications, Serial Nos. 180,143 and 221,596, filed by one of us, it is disclosed that species of Erythrina contain an alkaloidal free fraction which acts to paralyze selectively the motor nerve ending of striated muscle, or exhibit a typical curare-like action. These new substances may be substituted for curare.

The physiologically active alkaloidal free fraction is found in various parts of plants of the species of Erythrina, such as the bark of stems or roots, seeds, flowers, etc. The alkaloidal fraction obtained from all of the species exhibits similar physiological action.

In the co-pending applications, there are disclosed processes for the production of the active alkaloidal free fraction from various species of the genus Erythrina, which shows a typical curare-like action—that of selectively paralyzing the motor nerve endings of striated muscle. It is further disclosed that the active free fraction from a particular species may contain a number of individual alkaloids which exhibit similar pharmacological properties, but which exhibit different physical and chemical properties, and that for this reason it was necessary to develop special methods of isolation and purification for each individual alkaloid.

The present application is a continuation-in-part of the above mentioned co-pending applications, and is directed to special processes for the preparation of the three alkaloids, erythramine, erythraline and erythratine, from the total alkaloidal free fraction obtained from a certain group of species of the genus Erythrina.

According to the co-pending applications several methods may be employed for obtaining the active free fraction. In many cases, the inert alkaloid hypaphorine occurs with the new physiologically active alkaloidal free fraction and, if present, may be separated from the crude extract before the latter is treated for the production of the active substances. This may be accomplished by acidulating the aqueous solution containing the crude extract, extracting out any fatty material and crystallizing out the corresponding hypaphorine salt. The solid remaining after the hypaphorine separation may then be slightly alkalinized and further processed for the production of the physiologically active alkaloidal free fraction.

According to the preferred method, however, the selected starting material (that is seeds, flowers, etc.) may be freed from fats inherent therein, the alkaloids extracted with an agent such as methyl alcohol, and the alcoholic extract evaporated. The alkaloidal free fraction thus obtained is dissolved in water, the aqueous solution acidified, and any residual fats extracted. The aqueous mixture is then made slightly alkaline and extracted with an immiscible solvent for the direct production of the physiologically active alkaloidal free fraction.

The solvents to be employed for removing the fatty substances will depend upon the selected starting material. For example, when seeds are used, the fatty substances inherent therein may be removed by extraction with petroleum ether, carbon tetrachloride, di-ethyl ether, chloroform, etc. Any traces of the active alkaloidal fraction removed with the fatty substances may be recovered by extraction of the solvents with dilute aqueous acids.

For extraction of the physiologically active alkaloidal free fraction from the alkaline solution, any immiscible organic solvent may be used. Chloroform, carbon tetrachloride, benzene, toluene, etc., are entirely suitable and typical of further equivalent solvents which may be employed.

Also, in treating the seeds, it has been found that the alkaloidal free fraction may be obtained by treating the ground seeds, or defatted ground seeds, with water. The treated material is concentrated to crystallize hypaphorine and the residue is then worked up for the production of the active principles.

In treating the bark of roots, stems, or flowers, the resinous substances may be separated out together with the active alkaloidal free fraction by extracting with an alcohol such as methyl or ethyl alcohol and the resinous substances precipitated by treatment with water. The water used at this point may be acidulated water. Following their precipitation, the resinous materials may be removed by concentration and filtration and the filtrate further processed for producing the active alkaloid.

Other modifications of the process may also be practiced. For example, a slightly alkaline aqueous extract derived from the bark or seeds, may be extracted directly with an immiscible organic solvent and the physiologically active alkaloidal free fraction may be then separated from any fatty or resinous materials extracted with it.

The total alkaloidal free fraction thus obtained may then be treated for the production of individual alkaloids therefrom.

For the production of the three specific alkaloids, erythramine, erythraline and erythratine, the total alkaloidal free fraction is first converted to a salt mixture of the alkaloids, say, a hydriodide, which is fractionally crystallized from an organic solvent, for example, ethyl alcohol. In this manner, there is first obtained a mixture of erythramine and erythraline hydriodides, which may be separated by fractional crystallization from water. The erythraline salt being least soluble is obtained first; from it the crystalline base is obtained and recrystallized from alcohol. The pure crystalline erythraline has a melting point of about 105–107°, and rotation $\alpha^{27}_D = +211.8°$ (absolute alcohol). Pure crystalline erythramine has a melting point of about 103–104° C.; $[\alpha]^{29}_D = +227.6°$.

From the salt mixture remaining in the alcoholic mother liquors after crystallization of the erythramine-erythraline hydriodide mixture, another individual alkaloid, erythratine may be crystallized in the form of its hydriodide, from which the free base may be obtained and recrystallized from diethyl ether. Pure crystalline erythratine has a melting point of about 170–170.5°, and rotation $\alpha^{25}_D = +172.9°$.

All of these new alkaloids exhibit a strong paralyzing effect on the motor nerve endings; erythratine exhibits a more prolonged action.

The genus Erythrina may be divided into several sections or groups, each of which comprises several species which bear a certain botanical relationship to each other and which contain essentially the same alkaloids.

The species mentioned herein are examples of species which contain quantities of the alkaloids, erythramine, erythraline and erythratine. It is to be understood that species not mentioned, such as *E. Grisebachii* Urb and *E. velutina forma aurantiaca* (Ridl.) Kruk. which bear certain botanical relationships to those species mentioned, may be utilized also for the extraction of erythramine, erythraline and erythratine by the methods herein shown.

In the following examples, the process of the instant invention is illustrated as applied to the total alkaloidal free fractions obtained from certain species of Erythrina. By the processes exemplified, the individual alkaloids, erythramine, erythraline, and erythratine may be obtained from the species mentioned, as well as from certain botanically related species, as described.

However, in some instances, where one or the other individual alkaloid may be present in preponderantly large quantity, it may be advisable to apply the process to the production of such alkaloid. This will be readily understood by reference to the various examples given. Thus, in the case of the total alkaloidal fraction obtained from *E. Glauca* Willd., the process is illustrated as applied to the production of all three alkaloids, erythramine, erythraline, and erythratine. However, in the cast of the alkaloidal fraction from *E. variegata* L., *E. Folkersii* Kruk. and Mold., and *E. velutina* Willd., the process is shown as applied to the production of erythramine and erythraline which predominate in those species, while in the case of the alkaloidal fraction from *E. Fusca* Lour. the process is applied to the production of erythraline. In the last-named species, erythraline may be directly isolated.

These examples are given by way of illustration, merely, and it will be understood that the general methods disclosed herein may be applied to the total alkaloidal free fraction of the species specifically identified as well as to certain botanically related species of the same genus, as herein disclosed, and it will be understood that the procedures exemplified may be appropriately modified and adapted to the individual species being treated, as may be deemed desirable, in view of the teachings herein, without departing from the spirit and scope of the invention.

*Example I*

The crude active alkaloidal free fraction obtained from seeds of *Erythrina Glauca* Willd. according to the methods referred to above, is dissolved in about three parts of absolute alcohol and treated with the calculated quantity of sodium iodide and glacial acetic acid. The amount and degree of dryness of the alcohol is adjusted so that the sodium acetate remains dissolved. After standing at 10° C., the solution is filtered and the crude mixed hydriodides are obtained by evaporation of the solvent. Such a salt mixture generally melts at about 242–244° C. with decomposition and shows $[\alpha]^{27.5°}_D = +196.4°$ (approximately). A second crop of salts obtained from the mother liquor by concentrating to approximately half volume, melts at 241–243° C. with decomposition and shows $[\alpha]^{27°}_D = +200.8°$. A third crop of hydriodide obtained from the mother liquor by concentrating again to half volume, melts at 242° C. with decomposition and shows $[\alpha]^{26°}_D = +119.0°$.

The first two crops of salts are mixtures of erythraline hydriodide and erythramine hydriodide and are separated by recrystallizing from water. The erythraline hydriodide separates first and gives a melting point of 249° C. with decomposition and $[\alpha]^{27°}_D = +176.9°$ (water). The erythramine hydriodide separates from the mother liquor after long standing and gives a melting point of 248–249° C. with decomposition and $[\alpha]^{27°}_D = +220.6°$.

The third crop of hydriodide crystals showing $[\alpha]^{26°}_D = +119°$ is practically pure erythratine hydriodide which is recrystallized from absolute alcohol to give a salt having a melting point of about 242° C. and $[\alpha]^{25°}_D = +110.2°$.

*Example II*

The crude active alkaloidal free fraction obtained from *Erythrina variegata* L., is treated in accordance with the process described in Example I, for the production of erythraline and erythramine hydriodide.

*Example III*

The crude active alkaloidal free fraction obtained from *Erythrina Folkersii* Kruk. and Mold. is treated in accordance with the process described in Example I, for the production of erythraline and erythramine hydriodide.

*Example IV*

The crude active alkaloidal free fraction obtained from *Erythrina velutina* Willd. is treated in accordance with the process described in Example I, for the production of erythraline and erythramine hydriodide.

*Example V*

The crude active alkaloidal free fraction derived from *Erythrina fusca* Lour. is treated according to the process described in Example I above for the production of erythraline hydriodide. The amount of erythramine base or erythatine base in this species is so slight that the erythraline base or its hydriodide can be isolated directly in a comparatively pure state.

The free erythraline base is obtained by dissolving the hydriodide, in water, adding sodium bicarbonate until the solution is alkaline and extracting with chloroform. After distilling the solvent in vacuo erythraline is obtained generally as a solid or as a viscous gum. The solid or gum is recrystallized from absolute ethanol. The crystalline base has a melting point of about 105–107° C. and rotation $[\alpha]^{27°}_D = +211.8°$ (absolute alcohol).

Erythraline hydrobromide may be obtained by dissolving the erythraline base in absolute ethanol, acidifying with the calculated amount of 40% aqueous hydrobromic acid and adding anhydrous ethyl ether to the point of turbidity. The erythraline hydrobromide melts at about 243° C. and shows $[\alpha]^{27.5°}_D = +216.6°$ (water).

Erythratine base is obtained by dissolving the hydriodide in water, adding sodium bicarbonate until the solution is alkaline and extracting with chloroform. The solvent is distilled off in vacuo, whereupon the erythratine is obtained as a viscous gum which is recrystallized from a mixture of anhydrous ethyl ether and petroleum ether. It has a melting point of about 170–170.5° C., $[\alpha]^{25°}_D = +172.9°$.

Erythratine hydrobromide is obtained by dissolving the erythratine base in absolute ethanol, adding the calculated quantity of 40% aqueous hydrobromic acid and adding anhydrous ethyl ether to the point of turbidity. The erythratine hydrobromide melts at about 241° C. with decomposition.

We claim:

1. A substance selected from the group consisting of erythraline, a crystalline alkaloid obtainable from various botanically related species of Erythrina, and having a melting point of about 105–107° C. and $[\alpha]^{27}_D = +211.8°$ (absolute alcohol), and hydrohalides of such alkaloid.

2. Erythraline, a crystalline alkaloid obtainable from various botanically related species of Erythrina, and having a melting point of about 105–107° C. and $[\alpha]^{27}_D = +211.8°$ (absolute alcohol).

3. Hydrohalides of erythraline, a crystalline alkaloid obtainable from various botanically related species of Erythrina, and having a melting point of about 105–107° C. and $[\alpha]^{27}_D = +211.8°$ (absolute alcohol).

4. The hydriodide of erythraline, a crystalline alkaloid obtainable from various botanically related species of Erythrina, said alkaloid having a melting point of about 105–107° C. and $$[\alpha]^{27}_D = +211.8° \text{ (absolute alcohol)};$$

said hydriodide having a melting point of about 249° C. and $[\alpha]^{27}_D = +176.9°$ (water).

5. The hydrobromide of erythraline, a crystalline alkaloid obtainable from various botanically related species of Erythrina, said alkaloid having a melting point of about 105–107° C. and $[\alpha]^{27}_D = +211.8°$ (absolute alcohol); said hydrobromide having a melting point of about 243° C. and $[\alpha]^{27.5}_D = +216.6°$ (water).

6. In a process for the production of the alkaloid erythraline of melting point about 105–107° C. and $[\alpha]^{27}_D = +211.8°$ (absolute alcohol) from parts of botanically related species of Erythrina containing said alkaloid, the steps comprising treating a solution of the physiologically active "free" alkaloid fraction from such species in absolute alcohol with sodium iodide and acetic acid, removing the less soluble mixed hydriodides formed, concentrating the mother liquor for a second crop, and crystallizing the two fractions from water to obtain erythraline hydriodide as the least soluble alkaloid hydriodide.

7. In a process for the production of the alkaloid erythraline of melting point about 105–107° C. and $[\alpha]^{27}_D = +211.8°$ (absolute alcohol) from parts of botanically related species of Erythrina containing said alkaloid, the steps comprising treating a solution of the physiologically active "free" alkaloid fraction from *E. glauca* Willd. in absolute alcohol with sodium iodide and acetic acid, removing the less soluble mixed hydriodides formed, concentrating the mother liquor for a second crop, and crystallizing the two fractions from water to obtain erythraline hydriodide as the least soluble alkaloid hydriodide.

8. In a process for the production of the alkaloid erythraline of melting point about 105–107° C. and $[\alpha]^{27}_D = +211.8°$ (absolute alcohol) from parts of botanically related species of Erythrina containing said alkaloid, the steps comprising treating a solution of the physiologically active "free" alkaloid fraction from *E. velutina* Willd. in absolute alcohol with sodium iodide and acetic acid, filtering the less soluble mixed hydriodides formed, concentrating the mother liquor for a second crop, and crystallizing the two fractions from water to obtain erythraline hydriodide as the least soluble alkaloid hydriodide.

9. In a process for the production of the alkaloid erythraline of melting point about 105–107° C. and $[\alpha]^{27}_D = +211.8°$ (absolute alcohol) from parts of botanically related species of Erythrina containing said alkaloid, the steps comprising treating a solution of the physiologically active "free" alkaloid fraction from *E. fusca* Lour. in absolute alcohol with sodium iodide and acetic acid, filtering the less soluble mixed hydriodides formed, concentrating the mother liquor for a second crop, and crystallizing the two fractions from water to obtain erythraline hydriodide as the least soluble alkaloid hydriodide.

10. A process for the production of the alkaloid erythraline of melting point of about 105–107° C. and $[\alpha]^{27}_D = +211.8°$ (absolute alcohol) comprising treating a solution of the physiologically active alkaloidal "free" fraction from parts of botanically related species of Erythrina containing said alkaloid in absolute alcohol with sodium iodide and acetic acid, filtering the less soluble mixed hydriodides formed, concentrating the mother liquor for a second crop, crystallizing the two fractions from water to obtain erythraline hydriodide as the least soluble alkaloid hydriodide, extracting an alkalinized aqueous solution of such alkaloid salt with an organic solvent, and treating the thus crystallized alkaloid with a hydrohalogen acid.

11. In a process for the production of the alkaloid erythraline of melting point about 105–107° C. and $[\alpha]^{27}_D = +211.8°$ (absolute alcohol) from parts of botanically related species of Erythrina containing said alkaloid, the step comprising forming the mixed crystalline hydriodides of said erythraline and the alkaloid erythramine of melting point about 103–104° C., from the physiologically active "free" alkaloid fraction from such species by reacting said "free" fraction with hydrogen iodide.

12. In a process for the production of the alkaloid erythraline of melting point about 105–107° C. and $[\alpha]^{27}_D = +211.8°$ (absolute alcohol) from parts of botanically related species of Erythrina containing said alkaloid, the steps comprising forming the crystalline hydriodides of said erythraline and the alkaloid erythramine of melting point about 103–104° C., from the physiologically active "free" alkaloid fraction from such species by reacting said "free" fraction with hydrogen iodide, and recovering the least soluble hydriodide by crystallization of the mixture of erythraline and erythramine hydriodides from water.

13. A process for the production of the alkaloid erythraline of melting point about 105–107° C. and $[\alpha]^{27}_D = +211.8°$ from parts of botanically related species of Erythrina containing said alkaloid, comprising forming the crystalline hydriodides of said erythraline and the alkaloid erythramine of melting point about 103–104° C., from the physiologically active "free" alkaloid fraction from such species by reacting said "free" fraction with hydrogen iodide, recovering erythraline hydriodide as the least soluble hydriodide by crystallization of the mixture of erythraline and erythramine hydriodides from water, and recovering the alkaloid base erythraline from its hydriodide.

KARL FOLKERS.
FRANK KONIUSZY.

CERTIFICATE OF CORRECTION.

Patent No. 2,280,816.　　　　　　　　　　　April 28, 1942.

KARL FOLKERS, ET AL.

It is hereby certified that error appears in the printed specification of the above numbered patent requiring correction as follows: Page 4, second column, line 16, claim 13, before the word "from" insert --(absolute alcohol)--; and that the said Letters Patent should be read with this correction therein that the same may conform to the record of the case in the Patent Office.

Signed and sealed this 4th day of August, A. D. 1942.

Henry Van Arsdale,
　　　　　　　　　　　　　　Acting Commissioner of Patents.

(Seal)